(12) United States Patent
Lusted

(10) Patent No.: US 12,160,492 B2
(45) Date of Patent: Dec. 3, 2024

(54) DEVICE-TO-DEVICE LINK TRAINING

(71) Applicant: Intel Corporation, Santa Clara, CA (US)

(72) Inventor: Kent C. Lusted, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/374,475

(22) Filed: Sep. 28, 2023

(65) Prior Publication Data

US 2024/0064216 A1 Feb. 22, 2024

Related U.S. Application Data

(63) Continuation of application No. 16/859,689, filed on Apr. 27, 2020, now Pat. No. 11,818,237.

(51) Int. Cl.
| | |
|---|---|
| *H04L 69/24* | (2022.01) |
| *H04L 49/00* | (2022.01) |
| *H04L 49/351* | (2022.01) |
| *H04L 69/324* | (2022.01) |

(52) U.S. Cl.
CPC .......... *H04L 69/24* (2013.01); *H04L 49/3054* (2013.01); *H04L 49/351* (2013.01); *H04L 69/324* (2013.01)

(58) Field of Classification Search
CPC ... H04L 69/24; H04L 49/3054; H04L 49/351; H04L 69/324
See application file for complete search history.

(56) References Cited

U.S. PATENT DOCUMENTS

| | | | |
|---|---|---|---|
| 8,520,566 B2 | 8/2013 | Tseng et al. | |
| 8,571,070 B2 | 10/2013 | Ghiasi et al. | |
| 10,164,912 B2* | 12/2018 | Ran | H04L 49/3054 |
| 10,291,754 B2 | 5/2019 | Parnaby et al. | |
| 10,511,549 B2* | 12/2019 | Healey | H04L 1/0041 |
| 10,530,906 B2* | 1/2020 | Healey | H04L 69/324 |

(Continued)

OTHER PUBLICATIONS

IEEE, "IEEE P802.3ck™/D1.1 Draft Standard for Ethernet Amendment: Standard for Ethernet Amendment: Physical Layer Specifications and Management Parameters for 100 GB/s, 200 GB/s, and 400 GB/s Electrical Interfaces Based on 100 GB/s Signaling", Feb. 10, 2020, 266 pages.

(Continued)

*Primary Examiner* — Chandrahas B Patel
(74) *Attorney, Agent, or Firm* — Compass IP Law PC

(57) ABSTRACT

Examples described herein relate to a network interface comprising physical medium dependent (PMD) circuitry, the PMD circuitry to during link training of at least one lane consistent with IEEE 802.3, exit to TIME_OUT state during TRAIN_LOCAL state based on consideration of expiration of a wait timer, loss of local_tf_lock state, and loss of remote_tf_lock state. In some examples, during link training for at least one lane consistent with IEEE 802.3, the PMD circuitry is to exit to TIME_OUT state during TRAIN_REMOTE state based on consideration of expiration of a wait timer, loss of local_tf_lock state, and loss of remote_tf_lock state. In some examples, link training consistent with IEEE 802.3 comprises performance of the PMD control function in Section 162.8.11 of IEEE 802.3ck.

30 Claims, 12 Drawing Sheets

(56) References Cited

U.S. PATENT DOCUMENTS

| | | |
|---|---|---|
| 10,715,356 B2 * | 7/2020 | Valliappan ........ H04L 25/03019 |
| 11,252,067 B2 | 2/2022 | Bharadwaj et al. |
| 2015/0186201 A1 | 7/2015 | Ran |

OTHER PUBLICATIONS

IEEE, "IEEE Standard for Ethernet, Amendment 3: Media Access Control Parameters for 50 GB/s and Physical Layers and Management Parameters for 50 GB/s, 100 GB/s, and 200 GB/s Operation", IEEE Computer Society, approved Dec. 5, 2018, 401 pages.
Notice of Allowance for U.S. Appl. No. 16/859,689, Mailed Jul. 7, 2023, 9 pages.

* cited by examiner

Figure 136-7—PMD control state diagram

DEVICE-TO-DEVICE LINK TRAINING

CROSS-REFERENCE TO RELATED APPLICATION

This application is a continuation of U.S. patent application Ser. No. 16/859,689, filed Apr. 27, 2020. The entire specification of which is hereby incorporated by reference in its entirety.

DESCRIPTION

Among network-connected devices, for devices to communicate with each other, common communications capabilities and parameters are discovered. Auto-negotiation (AN) is a process whereby end points of a link share information on various capabilities relevant to their communication. For an example of AN, see Clause 73 of IEEE 802.3-2018. Link partner devices exchange abilities and modes of operation via the exchange of base pages and, if requested, the link partner devices exchange next pages. According to Clause 73 of IEEE 802.3-2018, each device sends a list of its data-rate capabilities to its link partner. Auto-negotiation can determine the highest common capability and the highest common capabilities are used for communication between the link partner devices. After both devices receive their link partner's capability list, the devices can transition to the highest common data rate and feature capabilities.

DETAILED DESCRIPTION

Figure 1:
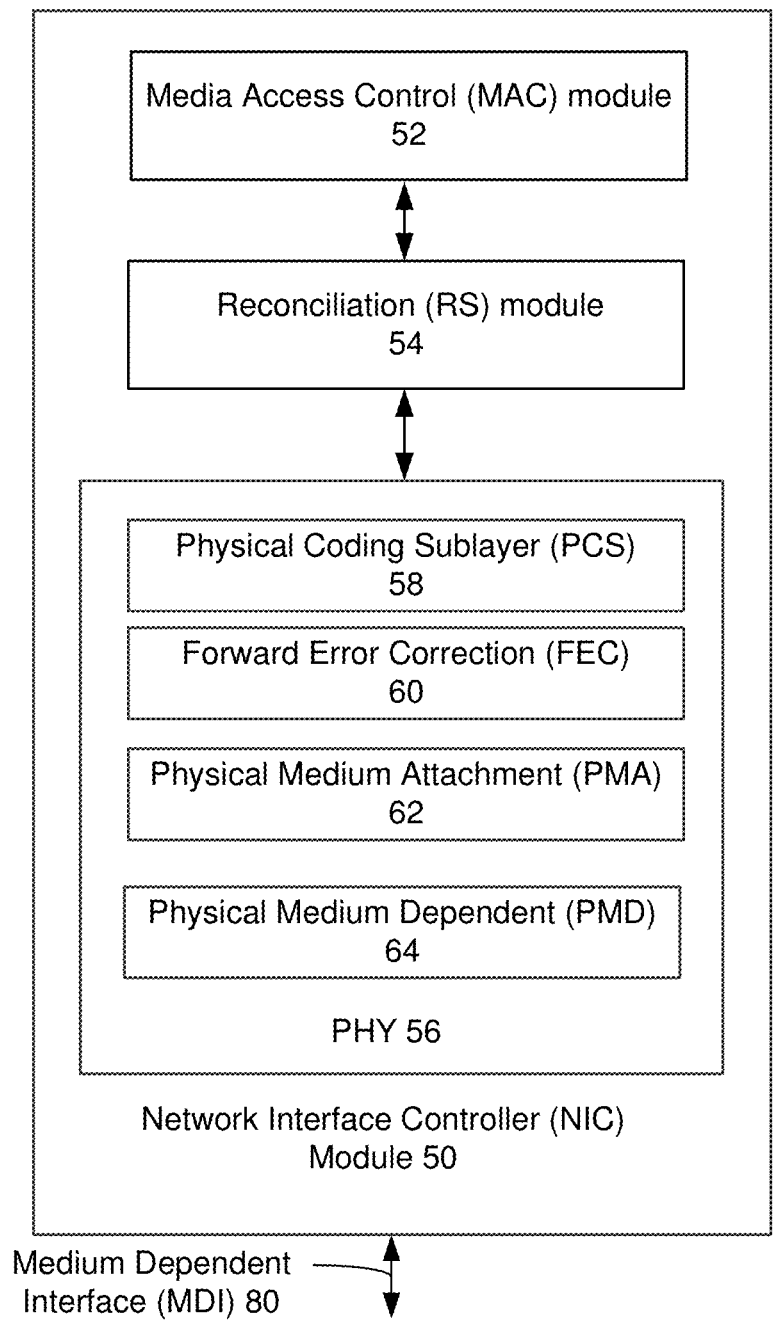
FIG. 1 depicts an example system.

Link training is a process used by a device connected through a copper cable, backplane, or other wired or wireless signal transmission media by which the transmitter and receiver communicate with each other in order to tune their equalization settings. For example, communications between a transmitter and a receiver at very high data rates tune equalization settings to mitigate frequency dependent signal attenuation. Equalization tuning can be applied at the transmitter (Tx) and/or at the receiver (Rx). For example, devices can tune equalizer settings of serializers/deserializers (SerDes) using link training. As link partners both include a transmitter and receiver, a link partner can simultaneously train the other partner's transmitter. Link training can enable tuning of the finite impulse response (FIR) filter for a channel in an application-specific integrated circuit (ASIC) or other device to achieve the desired bit error rate (BER), eye size, signal-to-noise ratio (SNR), eye size, or link error rate (e.g., uncorrectable and correctable forward error correction (FEC) errors, pseudorandom bit sequence (PRBS) errors, physical coding sublayer (PCS) errors, and so forth). In some examples, the receiver examines the eye after applying equalization to the signal and determines if eye height and/or eye width is acceptable. The receiver can make a decision to terminate link training because the eye is acceptable, or keep training to optimize the eye further. If the receiver requests that its link partner transmitter change the precursor, main cursor or post-cursor equalization setting, the eye examination process may begin again. After the link is trained, the two devices begin sending normal data traffic using the optimized transmitter settings.

Ethernet standards (e.g., IEEE 802.3cd-2018 and IEEE 802.3ck Draft 1.1) for 50 Gb/s and above over backplane and copper cables recommend use of a Physical Media Dependent (PMD) control function that enables adjusting the transmitter equalization settings as part of the link training. The PMD control function uses a handshake-based protocol for requesting coefficient changes. The protocol is described by state diagrams (e.g., FIGS. 136-7, 136-8, and 136-9 in IEEE Std 802.3-2018 and variations thereof). These figures are referenced in approved and draft standards for multiple PMDs (e.g., 50GBASE-KR, 100GBASE-KR2, 50GBASE-CR, and 100GBASE-CR2, etc).

Various embodiments attempt to reduce a likelihood of a deadlock condition that could result in failed link establishment where IEEE 802.3 Clause 136.8.10 PMD control function state machines are used by devices for link establishment, link training or link re-training. For example, if devices 1 and 2 are attempting to form a link in accordance with clause 136-7 of IEEE 802.3ck Draft 1.1, in a scenario where AN is not used but a link training protocol is used, a scenario can occur where the devices become out of synch during TRAIN_LOCAL or TRAIN_REMOTE states as decode ability is lost. However, the link training protocol waits until after a timer expires (e.g., max_wait_timer_done is true) before entering a TIMEOUT state. Various embodiments provide a check during states TRAIN_LOCAL and/or TRAIN_REMOTE defined for devices 1 and/or 2 to exit to TIMEOUT state the sooner of any of (a) local_tf_lock is not true, (b) remote_tf_lock is not true, or (c) a max_wait_timer_done is true. Accordingly, if a decode ability is lost during TRAIN_LOCAL or TRAIN_REMOTE states, then a device can exit to TIMEOUT state earlier than waiting max_wait_timer_done is true thereby potentially reducing the time to restart training and time to achieve link in general.

For example, while device 1 is operating in state TRAIN_LOCAL or TRAIN_REMOTE, device 1 can exit to TIMEOUT state if any of conditions (a)-(c) is met. Likewise, while device 2 is operating in state TRAIN_LOCAL or TRAIN_REMOTE, device 2 can exit to TIMEOUT state if any of states (a)-(c) is met.

Various embodiments can be used for cloud scale data centers using copper cables or backplanes for scenarios including but not limited to server-to-network interface (e.g., NIC), switch-to-switch, or switch-to-NIC. Link training can be applied to other wired communications or networking systems such as but not limited to FibreChannel, Infiniband, or Serial Attached Small Computer System Interface (SAS). Link training can be useful for 4-level pulse amplitude modulation (PAM) links (e.g., PAM4 links), PAM4, PAM5, PAM6, n-level PAM links (where n is an integer), non-return-to-zero (NRZ) line code, and so forth.

For example, link establishment, link training or link re-training can be applied by a base station that supports communications using wired or wireless protocols (e.g., 3GPP Long Term Evolution (LTE) (4G) or 3GPP 5G), on-premises data centers, off-premises data centers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

In some examples, a supervisory timer is not used to cause link training to terminate during operation of IEEE 802.3 Clause 136.8.10 PMD control function state machines. However, according to some embodiments, expiration of a supervisory timer can be used to restart operation of IEEE 802.3 Clause 136.8.10 PMD control function state machines.

Reference to any standard herein refers to any version including prior versions, current and future versions as well as proprietary derivatives thereof.

FIG. 1 is a block diagram illustrating Ethernet port circuitry in a network interface controller 50. The Ethernet port logic includes a Media Access Control (MAC) module 52, a reconciliation sublayer module 54 and a PHY module 56. The PHY module 56 can include a physical medium attachment (PMA) sublayer module 62, Physical Medium Dependent (PMD) sublayer 64, a forward error correction (FEC) module 60 and a physical coding sublayer (PCS) module 58.

MAC module 52 is configured to transfer data to and from the PHY module 56. The Reconciliation Sublayer (RS) module 54 can provide a mapping operation that reconciles the signals at a Media Independent Interface (MII) to the Media Access Control (MAC)-Physical Signaling Sublayer (PLS) service definitions. MAC module 52 can be configured to implement aspects of the MAC layer operations and the RS module 54 can be configured to implement reconciliation sublayer operations.

The Physical Medium Dependent (PMD) sublayer 64 can be responsible for interfacing to transmission medium, Medium Dependent Interface (MDI) 80. Various embodiments of PMD sublayer 64 can perform link establishment, link training or link re-training in accordance with embodiments described herein by exiting to TIMEOUT state if during TRAIN_LOCAL and/or TRAIN_REMOTE states, detection occurs for any of (a) local_tf_lock is not true, (b) remote_tf_lock is not true, or (c) a max_wait_timer_done is true. The Physical Medium Attachment (PMA) sublayer 62 can perform transmission, reception, signal detection, clock recovery and skew alignment. PMD 64 and PMA 62 can be configured to transmit and receive serial data over the MDI 80.

In some examples, PMD 64 and PMA 62 can include or use a serializer de-serializer (SerDes). In some examples, link training and re-training can be provided to adjust filter parameters of a transmit and/or receive equalizer used by a SerDes. For example, a software SerDes driver executed by a processor in a host or a network interface can be used to change a transmit equalizer parameter. In some examples, any combination of hardware, software and/or firmware can be used to manage and perform link training and/or link re-training.

In some examples (e.g., for 100GBASE-CR1 or 100GBASE-KR1), FEC module 60 may decode data passed from the PMD 64 and PMA 62 to the PCS module 58 or encode data passed from the PCS module 58 to the PMD 64 and PMA 62a, 62b. In some examples, (e.g., for 200G and 400G modes), PCS module 58 includes FEC module 60. Forward error correction code may improve the reliability of data transmission at higher line speeds.

In the transmit direction, MAC module 52 can receive data to be transmitted in a media access control (MAC) frame over MDI 80, and generates the MAC frame that includes inter-packet gap (IPG), preamble, start of frame delimiter (SFD), padding, and Cyclic Redundancy Check (CRC) bits in addition to the received data before passing the MAC frame to the PHY module 56. The PHY module 56 can encode the MAC frame for reliable serial transmission over the MDI 80.

In the receive direction, MAC module 52 can receive MAC frames over a data bus from PHY module 56. MAC module 52 can accept MAC frames from PHY 56, perform Ethernet frame detection and validation, cyclic redundancy check (CRC) validation, update statistics counters, strip out the CRC, preamble detection and removal, and start of frame delimiter (SFD) detection and removal, and forward the rest of the MAC frame that includes headers for other protocols to a next layer (for example, an Internet protocol (IP) layer) for processing.

Another example system that can use embodiments described herein in its PMD is described with respect to see FIG. 162-1 in IEEE 802.3ck Draft 1.1.

Figure 2A:
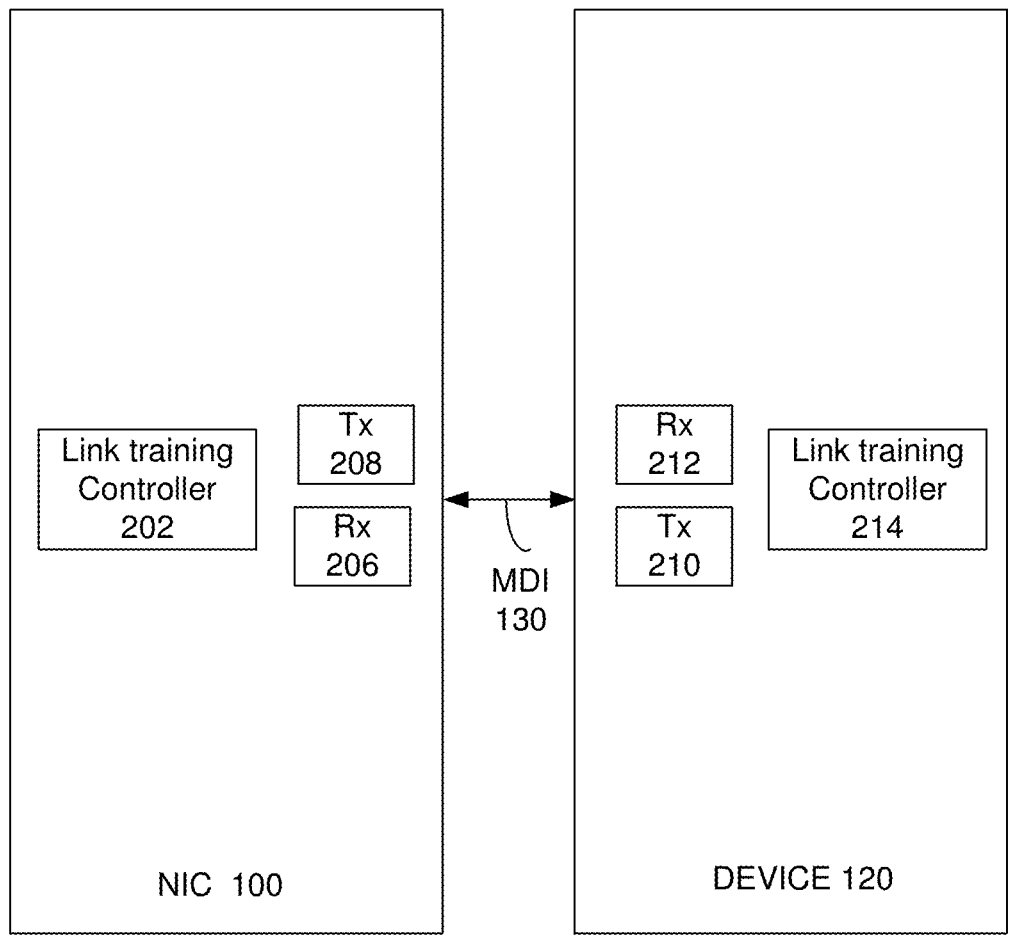
FIGS. 2A-2D depict example systems.

FIG. 2A illustrates a simplified example of a transmitter-receiver pair for between a network interface controller 100 and a device 120. MDI 130 provides a link between network interface controller 100 and device 120 by transferring data in parallel over one or more lanes. Device 120 can be any device such as another NIC, a switch, router, a server, a host computing platform, and so forth.

Network interface controller 100 can include a host receiver 206 and a host transmitter 208 for at least one lane of an electrical link between the network interface controller 100 and device 120. Device 120 can include a module receiver 212 and module transmitter 210 for an electrical link between network interface controller 100 and device 120.

For example, link training controller 202 of NIC 100 can initiate or manage link establishment, link training, or link re-training operations as described herein. Link training controller 202 can be implemented as any or a combination of: a driver, microcontroller, or other software in a host or network interface.

Transmitter (Tx) 208/210 or receiver (Rx) 206/212 can use a SerDes to serialize or deserialize a signal. When a SerDes is turned on and a signal is received, Rx tuning can be used to clean-up the signal quality. When there is a time limit to perform Rx tuning, a signal is to be passed to a PCS layer within the time limit and the link comes-up if the link is acceptable. If the link does not pass, training can be restarted. In some examples, Tx 208-Rx 212 and/or Tx 210-Rx 206 can utilize independent Rx tuning. In some embodiments, an amount of time to perform equalizer tuning is the same for Tx 208-Rx 212 and Tx 210-Rx 206.

When auto-negotiation is used to establish link between two ethernet ports an IEEE defined procedure is followed. First, a "base page" exchange can be performed to determine common capabilities and select an operating mode (e.g., link speed (e.g., 1000BASE-KX, 10GBASE-KX4 . . . 100GBASE-CR4 and so forth), FEC mode, pause capability, and so forth). Next, an arbitrary length next page exchange phase can occur. Next page exchange can be used, for example, to advertise IEEE capabilities as well as non-IEEE capabilities such as the Ethernet Consortium modes. At the end of next page exchange, the selected operating mode can be configured and a link-training phase can begin. During this link training phase, changes in the peer transmit (e.g., Tx 208 or Tx 210) equalization settings and monitoring the effect on link quality at the receiver (e.g., Rx 206 or Rx 212) and adjusting equalization settings to optimize the link can occur.

According to various embodiments, link training controller 202 can attempt to achieve link with another device (e.g., device 120) by use of IEEE 802.3 Clause 73 Auto-Negotiation to determine the highest common speed then use the PMD Control Function (e.g., "link training") protocol to train the receivers for the channel impairments in accordance with various embodiments described herein. In some examples, link training controller 202 can attempt to achieve link with another device (e.g., device 120) and bypass the IEEE 802.3 Clause 73 Auto-Negotiation protocol and apply the PMD Control Function protocol in accordance with various embodiments described herein. For example, minimum supported features can be applied between links where capabilities of endpoints are known and connected together to perform synchronization. Capabilities of device can be known to the devices by sharing via a pervasive management agent, a previous link establishment, previously applied AN whereby device capabilities are learned, or other manners. Likewise, link training controller 214 can attempt to achieve link with another device (e.g., NIC 100) in a similar manner as that of link training controller 202.

According to some embodiments, when link training controller 202 or 214 performs PMD Control Function protocol to train at least receiver equalizer settings to accommodate for channel impairments (e.g., arising out of signal transfer over backplane or conductive cable) whereby during TRAIN_LOCAL state or TRAIN_REMOTE state, link training controller 202 or 214 can detect for (a) whether training frame marker positions remain identified by the local receiver; (b) whether training frame marker positions remain identified by the receiver of the second device; or (c) a training timer has expired. For example, link training controller 202 or 214 can exit to TIMEOUT state if any of (a) local_tf_lock is not true, (b) remote_tf_lock is not true, or (c) a max_wait_timer_done is true. If a condition is met that leads to exiting training state, the link training controller can proceed to exit training and potentially restart training. For example, a training frame structure can follow a format depicted in frame in FIG. 136-3 in IEEE 802.3cd-2018.

Communications between devices can occur using any protocol. For example, Ethernet frames can be sent by NIC 100 to device 120. For example, Ethernet frames can be sent by device 120 to NIC 100. An Ethernet frame can include one or more of: a preamble, start of frame delimiter (SFD), destination MAC address, source MAC address, EtherType field, length field, frame check sequence (e.g., cyclic redundancy check (CRC)), and payload.

Figure 2B:
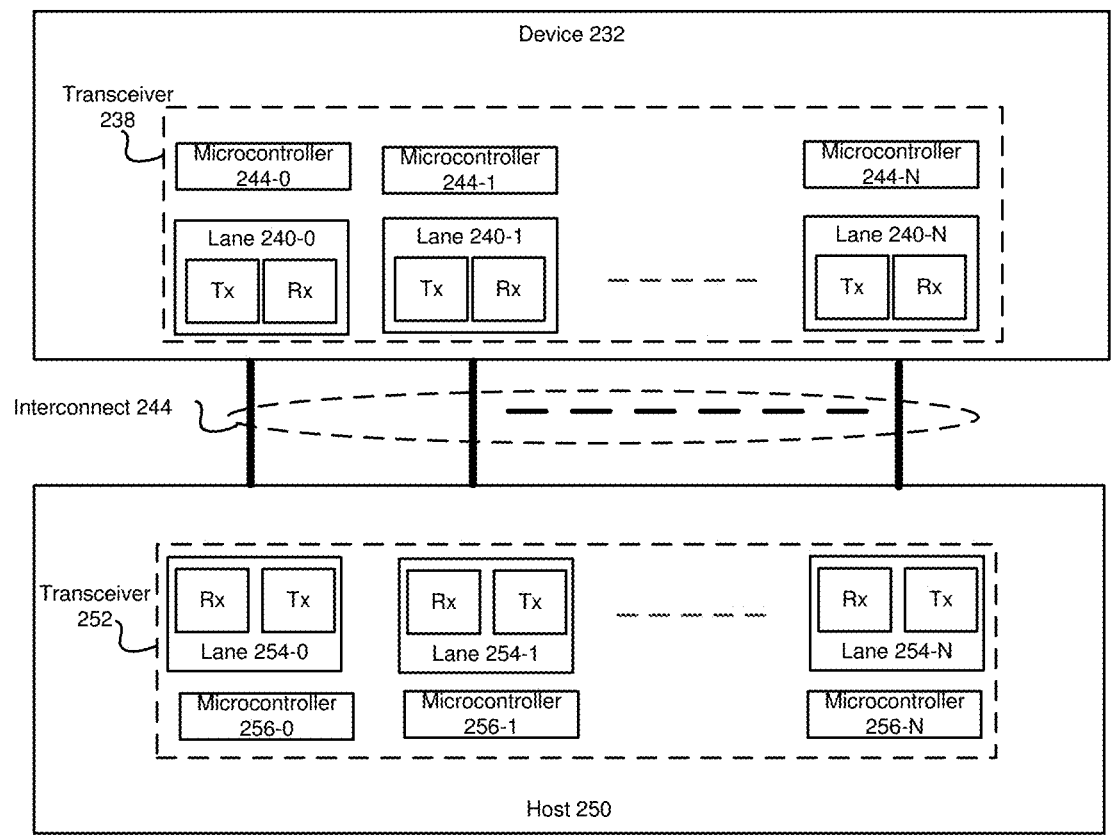

FIG. 2B depicts an example system for communicatively coupling a network device to another network device. For example, host 250 and device 232 can include a network device such as one or more of: a network interface, switch, router, server, host computing platform, interconnect, fabric, rack, or any computing or communications device. For example, device 232 can be connected to an interface with multiple electrical links (e.g., backplane or copper cable). The system provides for multiple lanes of transmit-receive pairs that can be used to transmit or receive electrical signals between host 250 and device 232. A lane can transmit and/or receive a signal. A transmitter of a lane can use an equalizer implemented in an analog circuit to generate an electrical signal for transmission. The equalizer can have one or more current sources that are used to create a signal whereby weights of current sources can be adjusted to change signal characteristics. Equalizer settings can be modified to change weights of current sources. For example, a digital-to-analog converter (DAC) can be used to create signal in the digital domain and output the result in an analog format.

Various embodiments use any of microcontrollers 244-0 to 244-N of device 232 to initiate and manage link training of transmitter and/or receiver equalizer settings with any of microcontrollers 256-0 to 256-N of host 250. Various embodiments of microcontrollers 244-0 to 244-N can perform Auto Negotiation to determine the highest common speed and/or use the PMD Control Function protocol to train the receivers for the channel impairments and exit to TIMEOUT state if any of (a) local_tf_lock is not true, (b) remote_tf_lock is not true, or (c) a max_wait_timer_done is true. In some examples, a PHY can receive an indication to start PMD control function (e.g., enter INITIALIZE state of FIG. 136-7 of IEEE 802.3cd-2018) by a system management reading indicator mr_restart_training in a register set or receiving indicator mr_restart_training from another device.

Transceiver 238 can be used for electrical signal transmission and receipt between device 232 and host network interface device 250. Transceiver 238 can provide multiple transmit and receive lanes for electrical signal communication between device 232 and host device 250. For example, lanes 240-0 to 240-N can provide transmit and receive circuitry for coupling with receive and transmit circuitry of lanes 254-0 to 254-N of host device 250. Lanes 240-0 to 240-N can provide serializer/deserializer (SerDes) formatting of signals. In some examples, transceiver 238 can be part of a PMD or PHY.

Device 232 can be communicatively coupled to host device 250 by an interconnect 244. Interconnect 244 can be electrical signal conductors that couple pins or holes of lanes 240-0 to 240-N of a pluggable device 232 to holes or pins of lanes 254-0 to 254-N of host 250. Host network interface device 250 can transmit or receive signals in electrical format to or from device 232.

Host device 250 can include transceiver 252 for communication with device 232. Transceiver 252 can include lanes 254-0 to 254-N where any of lanes 254-0 to 254-N includes receive and transmit circuitry. In some examples, transceiver 252 can be part of a PMD or PHY. Any microcontroller 256-0 to 256-N can be used to manage operation of its lane. Various embodiments of microcontrollers 256-0 to 256-N can perform Auto Negotiation to determine the highest common speed and/or use the PMD Control Function protocol to train the receivers for the channel impairments and exit to TIMEOUT state if any of (a) local_tf_lock is not true, (b) remote_tf_lock is not true, or (c) a max_wait_timer_done is true.

In some embodiments, a single microcontroller can manage equalizer settings of one or multiple lanes. The one or more parameters can cause a receiver or transmitter device in any of lanes 254-0 to 254-N to adjust its equalizer setting for a specific tap, whether to increase or decrease the coefficient value of an equalizer tap. In some embodiments, the settings of a tap can be adjusted independent of adjustment of settings of another tap.

In some examples, host 250 can request to change an equalizer setting of any tap of a transmitter equalizer circuit of device 232. Likewise, device 232 can request to change an equalizer setting of any tap of a transmitter equalizer circuit of host 250. Accordingly, device 232 and host 250 can adjust transmitter equalizer settings used by a partner device. Moreover, any of device 232 and host 250 can adjust receiver equalizer settings to compensate for channel distortions.

For example, to initiate an equalizer setting change, any microcontroller 244-0 to 244-N can determine a signal quality of a received signal and determine what transmitter side tap of host device 250 to change and whether to increment or decrement the setting of the tap. For example, an eye opening of a received signal can be measured. An eye can represent 1-to-0 and 0-to-1 transitions of a signal and indicate whether the transitions occur within isolated time regions. A microcontroller can estimate inter-symbol interference (ISI) and select settings based on an ISI reaching a minimum value. A microcontroller can search through available transmitter tap settings and select settings that lead to a most open eye. Transmitter equalizer settings can be changed periodically starting at or after link startup and can run periodically. Similar operations can occur for microcontroller 256-0 to 256-N to adjust transmit equalizer settings of device 232.

Any of device 232 or host 250 can perform packet processing such as one or more of: media access control, any protocol layer processing, security, routing, destination lookup, and so forth.

Figure 2C:
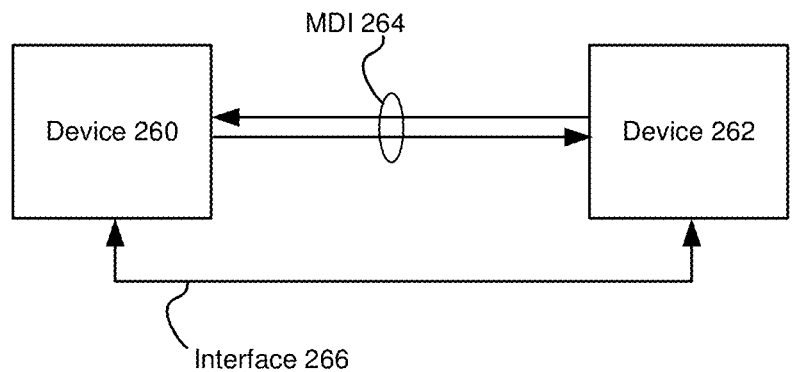

FIG. 2C depicts an example system whereby device 260 and device 262 can perform link establishment and communicate using an MDI 264 and interface 266 in accordance with various embodiments. In addition to use of MDI 264 or alternatively, interface 266 can be used to communicate commands, state information or other information. For example, information such as states of local_tf_lock and remote_tf_lock can be communicated using MDI 264 and/or interface 266 by a processor of device 260 reading a register of device 260 and sending the register value(s) to device 262. For example, information such as states of local_tf_lock and remote_tf_lock can be communicated using MDI 264 and/or interface 266 by a processor of device 262 reading a register of device 260 and sending the register value(s) to device 260. In some examples, a processor of device 262 can read a register value(s) of device 260. In some examples, a processor of device 260 can read a register value(s) of device 262. In some examples, devices 260 and 262 can be connected using interface 266 provided in a circuit board and devices 260 and 262 can be connected to the same circuit board or different circuit boards. In some examples, devices 260 and 262 can be connected using interface 266 provided in a rack or blade and devices 260 and 262 can be part of the same rack or blade. For example, interface 266 can be compliant with any standard such as Ethernet, InfiniBand, SPI, I2C, or other standards. In some examples, interface 266 can be considered an out-of-band interface.

Figure 2D:
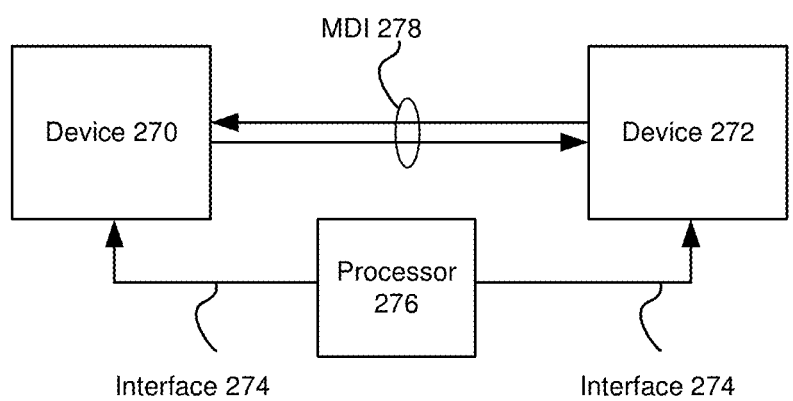

FIG. 2D depicts an example where device 270 and device 272 can perform link establishment and communicate using interface 274, processor 276, and MDI 278 in accordance with various embodiments. In addition to use of MDI 278 or alternatively, interface 274 can be used to communicate commands, state information or other information. For example, information such as states of local_tf_lock and remote_tf_lock can be communicated using interface 274 or MDI 278. For example, processor 276 can read a register state of device 270 and provide it to device 272 using interface 274. For example, processor 276 can read a register state of device 272 and provide it to device 270 using interface 274. The register state can include local_tf_lock and/or remote_tf_lock. In some examples, interface 274 can be considered an out-of-band interface.

References are made in various places to link establishment, link training, or link re-training. For an example of link establishment, link training, or link re-training, section 162.8.11 of IEEE 802.3ck Draft 1.1 states:
The PMD shall implement one instance of the PMD control function described in 136.8.11 for each lane with the following exceptions:
   a) The terminal count of max_wait_timer as specified in 136.8.11.7.3 is TBD.
   b) For k_list as specified in 136.8.11.4.4, the set of valid transmitter equalizer coefficient indices is {−3, −2, −1, 0, +1}.
   c) For the initial condition request as described in 136.8.11.2.1 the predefined transmitter equalizer settings are specified in 162.9.3.1.3.
   d) The coefficient select bits in the control field (Table 136-9) and the coefficient select echo bits in the status field (Table 136-10) have an additional combination, 1 0 1, for selecting c(−3).
   e) The "No equalization" value (see 136.8.11.2.4) of c(−3) is 0.
The PMD control functions operate independently on each lane.

Figure 7:
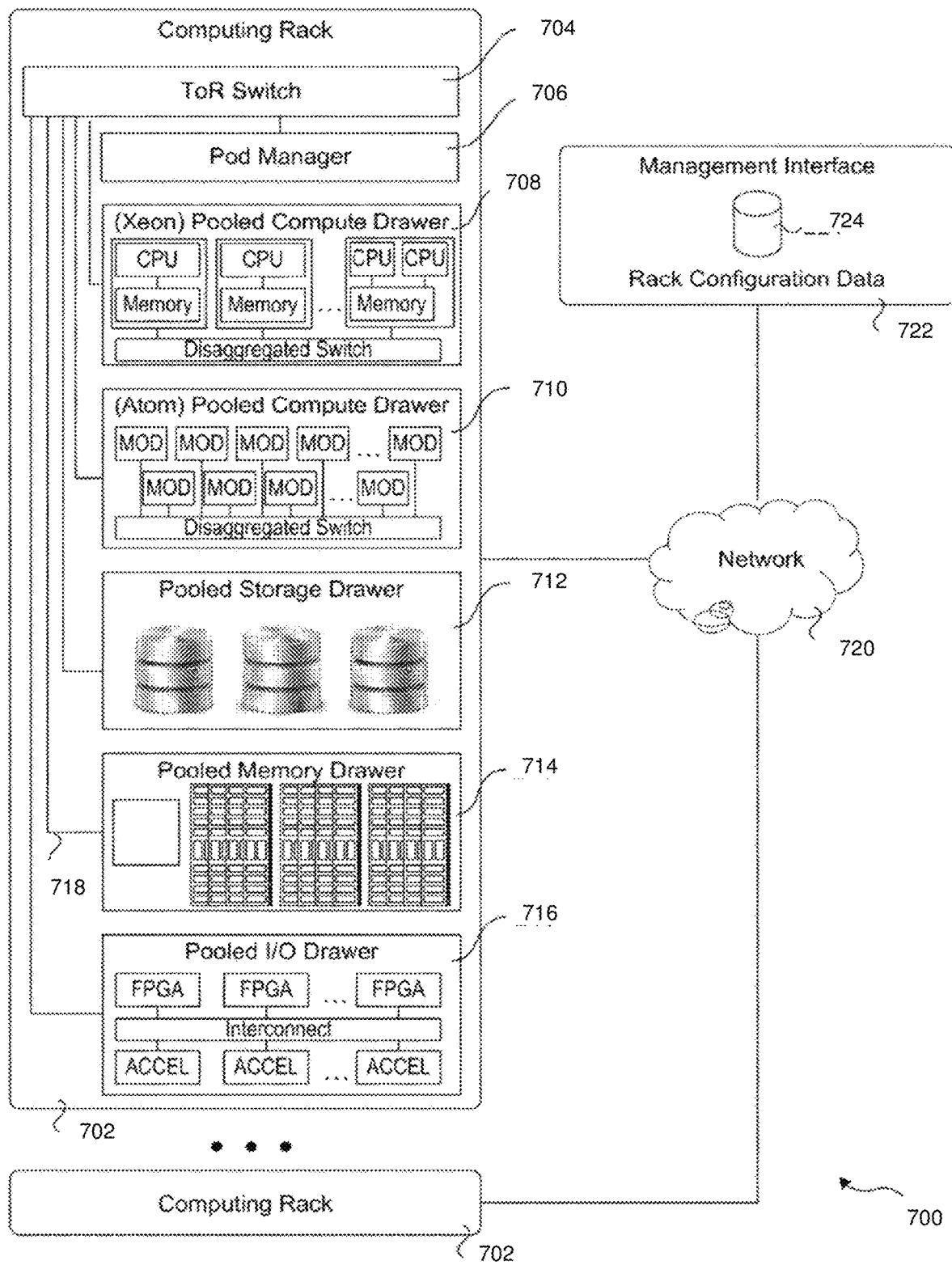
FIG. 7 depicts an environment.

Section 136.8.11 refers to IEEE 802.3cd-2018, specifically PMD control state diagram from FIG. 136-7.

Figure 3:
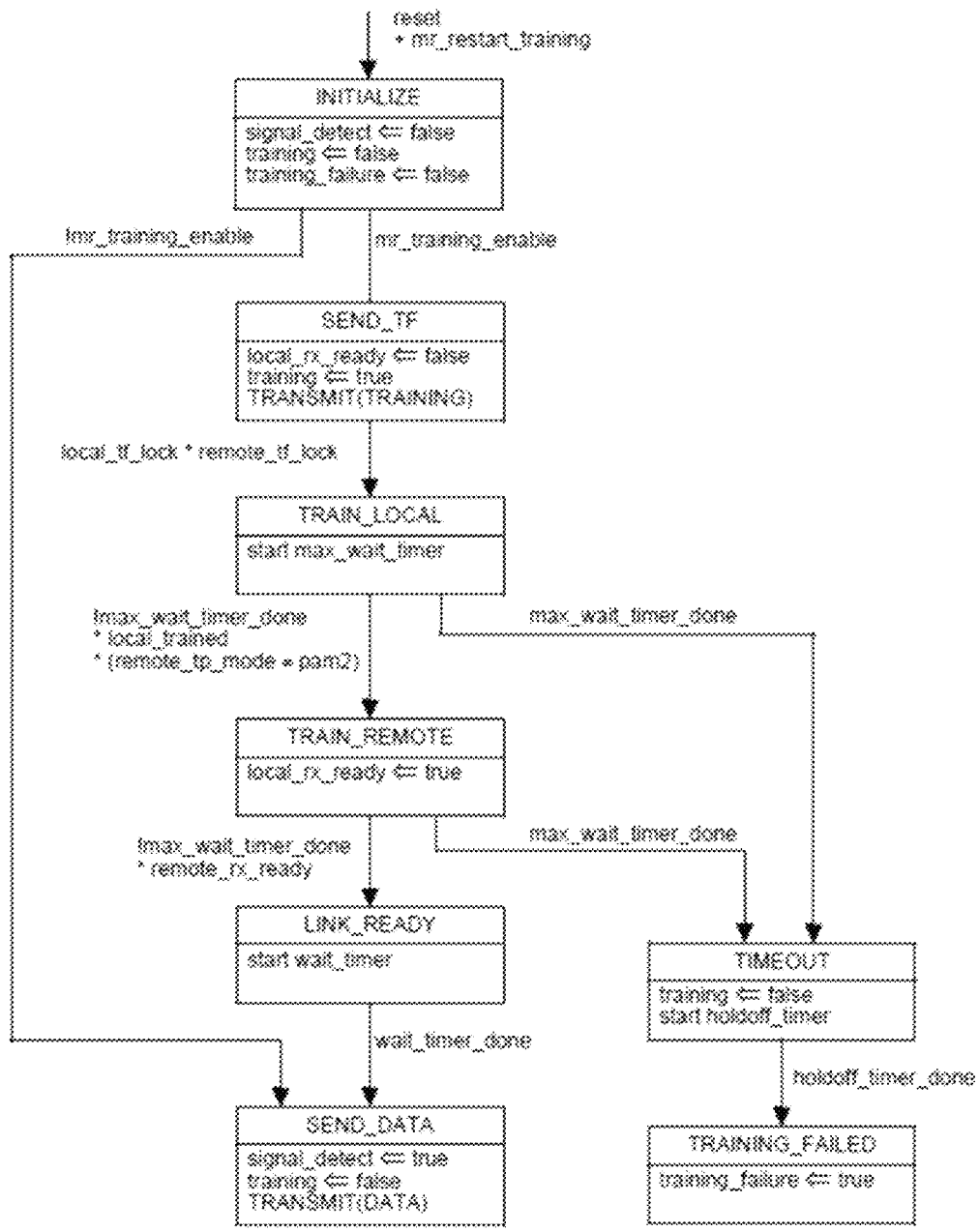
FIG. 3 depicts an example of a physical medium dependent (PMD) control state diagram.

FIG. 3 depicts an example of a PMD control state diagram from FIG. 136-7 of IEEE 802.3cd-2018. The state machine defined in IEEE 802.3cd-2018 FIG. 136-7 shows the flow to train a receiver for channel impairments. For example, a reset condition can cause entrance to state INITIALIZE to set up link establishment. State SEND_TF can include transmission of training frames under a training protocol with a handshake between endpoints. Checkpoints of local_tf_lock and remote_tf_lock indicate received training protocol formatted information successfully decoded by the respective local and remote transceiver. For example, local_tf_lock can indicate a local receiver has completed training frame decoding and communicates to its partner a state lock due to successfully finding a frame marker at a start of frame and decoding received bits. For example, remote_tf_lock can indicate a remote receiver has completed training frame decoding and a communication to its partner of a state lock due to successfully finding a frame marker at a start of frame and decoding received bits.

After a handshake, the control state diagram enters TRAIN_LOCAL state whereby the receiver receives training frames and converges its receiver to make change requests to equalizer settings of its own receiver to handle channel impairments (e.g., reduce signal to noise ratio (SNR), error reduction, and so forth). However, if max_wait timer expires before TRAIN_LOCAL completes, the state diagram proceeds to the TIMEOUT state. After TRAIN_LOCAL state completes, TRAIN_REMOTE state is entered whereby the local receiver waits for its partner to train its receiver to handle channel impairments and also indicate successful completion of training. However, if max_wait timer expires before TRAIN_REMOTE completes, the state diagram proceeds to the TIMEOUT state. In some examples, max_wait_timer can approximately 3 seconds, although any length can be used.

After TRAIN_REMOTE completes, state LINK_READY waits for both link partners to indicate TRAIN_LOCAL and TRAIN_REMOTE are completed. After state LINK_READY, state SEND_DATA allows data transmission between the link partners.

Signals local_tf_lock and remote_tf_lock can indicate that the training frame marker positions have been identified by the local receiver (former case) or the remote receiver (latter case). Note that in FIG. 136-17 that the condition to move from SEND_TF to TRAIN_LOCAL is gated by the signals local_tf_lock and remote_tf_lock being true. A single check is made prior to transitioning to state TRAIN_LOCAL. The state of signals local_tf_lock and remote_tf_lock are not checked again after SEND_TF. However, the PMD state machine of FIG. 3 does not autonomously recover from a partner breaking frame lock during link training when the Clause 73 Auto-Negotiation state machine is bypassed. Unless a high-level management agent (e.g., software or firmware) detects loss of local_tf_lock or remote_tf_lock during TRAIN_LOCAL and TRAIN_REMOTE, a link down or a link oscillation (e.g., link up/link down/link up and so forth) may occur.

An example cycle through the states of FIG. 3 is as follows:

| Device #1 | Device #2 |
|---|---|
| INITIALIZE | INITIALIZE |
| SEND_TF | SEND_TF |
| TRAIN_LOCAL | TRAIN_LOCAL |
| TRAIN_LOCAL | TRAIN_REMOTE |
| TRAIN_REMOTE | TRAIN_REMOTE |
| LINK_READY | LINK_READY |
| SEND_DATA | SEND_DATA |

It is possible during the TRAIN_LOCAL or TRAIN_REMOTE state that either the local receiver or remote receiver could lose frame lock. This might occur due to a bad decision by the local receiver or a momentary glitch in the transmit path or a transmitter calibration cycle, accidental local device reset, cable disconnect, etc. However, in the process of FIG. 3, a partner is not informed of a loss of frame lock until max_wait_timer_done is met. The duration of the loss of frame lock could be quite large (e.g., hundreds of milliseconds) during which the two end points become out-of-sync.

For example, the following scenario depicts an example situation whereby frame lock is lost during TRAIN_LOCAL or TRAIN_REMOTE and the possibility of devices not establishing link and entering deadlock despite executing the training state machine.

| Device #1 | Device #2 |
|---|---|
| INITIALIZE | INITIALIZE |
| SEND_TF | SEND_TF |
| TRAIN_LOCAL | TRAIN_LOCAL |
| ___ERROR:_RESET | TRAIN_LOCAL |
| INITIALIZE | TRAIN_REMOTE |
| SEND_TF | TRAIN_REMOTE |
| TRAIN_LOCAL | TRAIN_REMOTE |
| TRAIN_LOCAL | TIMEOUT |
| TRAIN_LOCAL | TRAINING_FAILED |
| TRAIN_REMOTE | INITIALIZE |
| TRAIN_REMOTE | SEND_TF |
| TRAIN_REMOTE | TRAIN_LOCAL |
| TIMEOUT | TRAIN_LOCAL |
| TRAINING_FAILED | TRAIN_REMOTE |
| INITIALIZE | TRAIN_REMOTE |
| SEND_TF | TRAIN_REMOTE |
| TRAIN_LOCAL | TRAIN_REMOTE |
| TRAIN_LOCAL | TIMEOUT |
| TRAIN_LOCAL | TRAINING_FAILED |
| TRAIN_REMOTE | INITIALIZE |
| TRAIN_REMOTE | SEND_TF |
| TRAIN_REMOTE | TRAIN_LOCAL |
| TIMEOUT | TRAIN_LOCAL |
| TRAINING_FAILED | TRAIN_REMOTE |
| INITIALIZE | TRAIN_REMOTE |
| SEND_TF | TRAIN_REMOTE |
| TRAIN_LOCAL | TRAIN_REMOTE |
| TRAIN_LOCAL | TIMEOUT |
| TRAIN_LOCAL | TRAINING_FAILED |

In this example, devices attempting to achieve link are not able to both achieve SEND_DATA states during this sequence, which can lead to an undesirably long time before achieving link.

Figure 4:
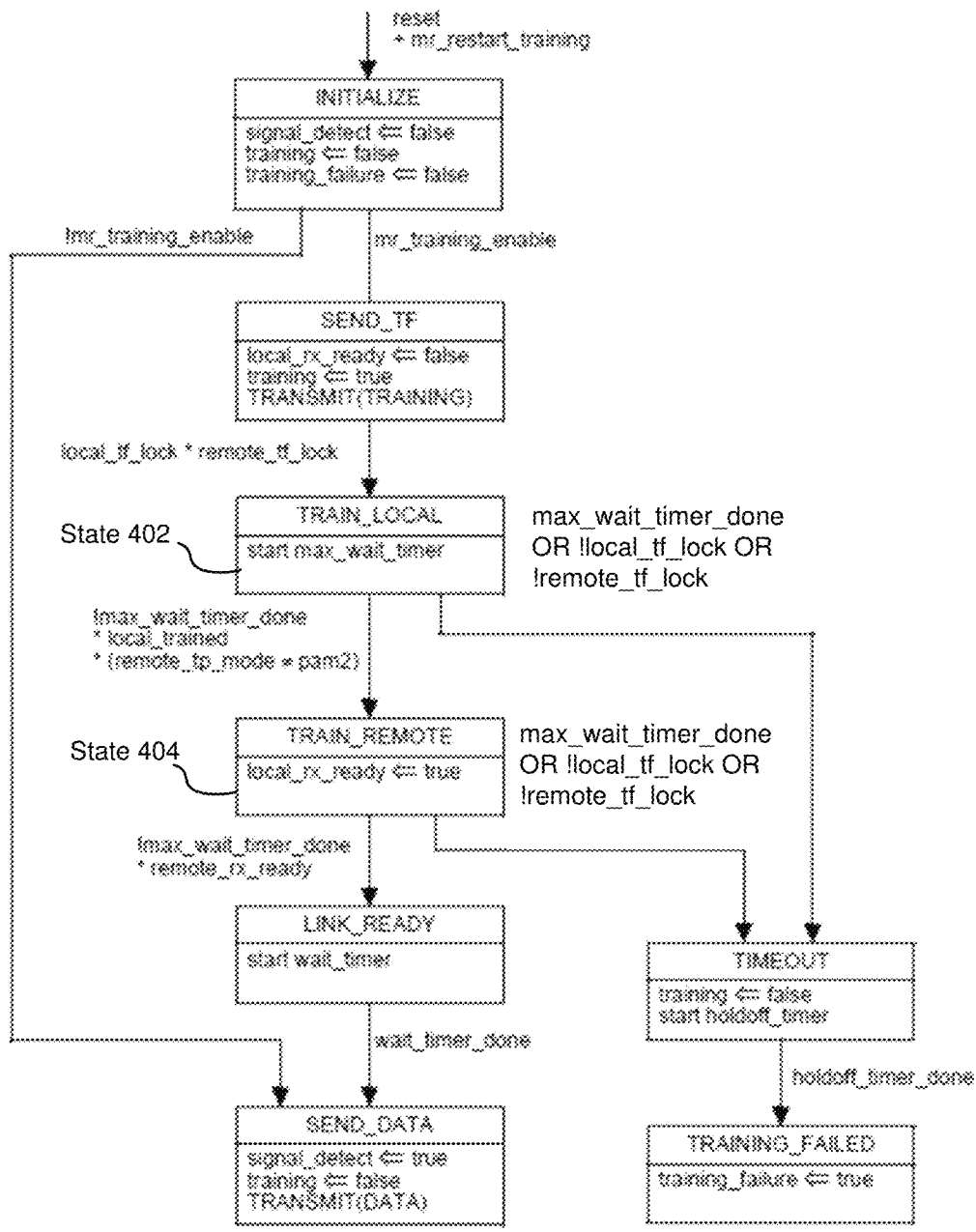
FIG. 4 depicts an example of a PMD control state flow in accordance with various embodiments.

FIG. 4 depicts an example of a PMD control state flow in accordance with various embodiments. Various embodiments monitor the local and receiver frame lock status (provided either locally or via the received training frame or other communication technique) after the initial lock (e.g., SEND_TF) is achieved to potentially avoid a deadlock condition. The loss of remote_tf_lock can be indicated by a partner clearing bit 9 of the status field structure per Table 136-10 in IEEE 802.3cd-2018 and a received training frame (from the partner) is decoded by the local receiver where local device maps bit 9 of the received frame (see, e.g., Table 136-10 of IEEE 802.3cd-2018) to be the variable remote_tf_lock. In addition to checking for timer expiration, various embodiments check for loss of local_tf_lock or remote_tf_lock during TRAIN_LOCAL and/or TRAIN_REMOTE to exit to the state machine's failure path (e.g., TIMEOUT). A PHY interface can self-recover and restore link up without software, firmware, or operator intervention and potentially reduce a time to establish link between devices or re-establish link between devices.

For example, during state 402, TRAIN_LOCAL, various embodiments exit to TIMEOUT state the sooner of any of (a) local_tf_lock is not true, (b) remote_tf_lock is not true, or (c) a max_wait_timer_done is true. For example, during state 404, TRAIN_REMOTE, various embodiments exit to TIMEOUT state the sooner of any of (a) local_tf_lock is not true, (b) remote_tf_lock is not true, or (c) a max_wait_timer_done is true. Accordingly, various embodiments do not wait for max_wait_timer to expire and check if local_tf_lock is false or remote_tf_lock is false during TRAIN_LOCAL and TRAIN_REMOTE in order to exit to TIMEOUT prior to expiration of max_wait_timer thereby potentially saving time spent to achieve link between devices and both devices entering SEND_DATA state.

Using the state flow of FIG. 4, an example scenario is as follows.

| Device #1 | Device #2 |
|---|---|
| INITIALIZE | INITIALIZE |
| SEND_TF | SEND_TF |
| TRAIN_LOCAL | TRAIN_LOCAL |
| ___ERROR:_RESET | TIMEOUT |
| INITIALIZE | TRAINING_FAILED |
| SEND_TF | INITIALIZE |
| SEND_TF | SEND_TF |
| TRAIN_LOCAL | TRAIN_LOCAL |
| TRAIN_REMOTE | TRAIN_REMOTE |
| LINK_READY | LINK_READY |
| SEND_DATA | SEND_DATA |

In this example, devices can enter SEND_DATA states due to returning to INITIALIZE state sooner.

In some examples, a supervisory timer could be added whereby if the state flow of FIG. 3 or FIG. 4 does not complete for both devices in a certain period of time, both devices can start the link establishment sequence from start. A network connection between devices may be used in such case via an out-of-band channel such as where both end points are physically located on the same board. Therefore, a microprocessor running software or code can monitor the state of these devices by reading a register through another interface, such as PCI Express, InfiniBand, or I2C or another management network in the system.

Figure 5:
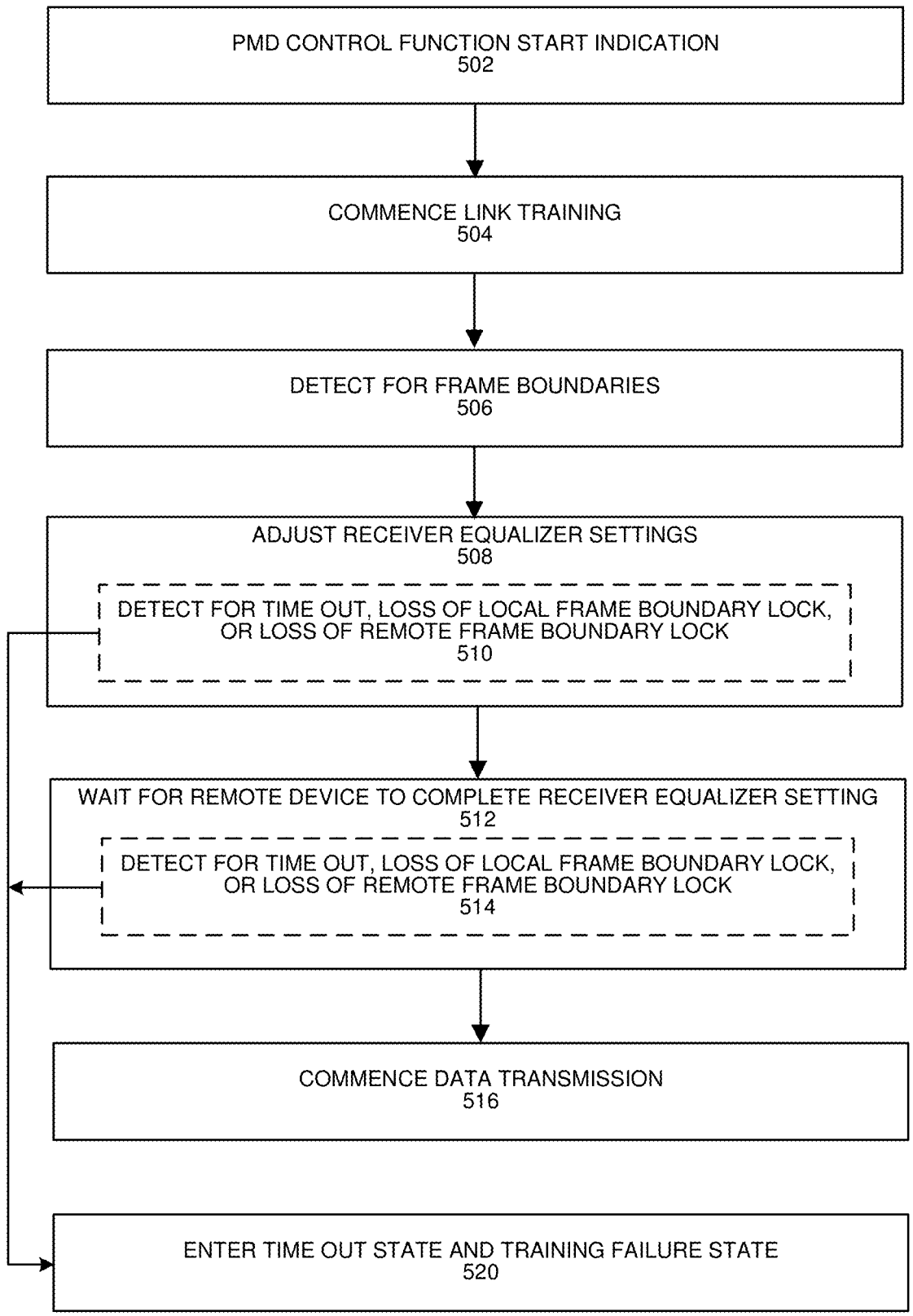
FIG. 5 depicts an example process.

FIG. 5 depicts a process. The process can be performed by a transceiver in a first device with a wired or wireless connection with a transceiver in a second device. For example, the first device can be an endpoint network interface, server, switch, host device, electrical or optical module, or any device. Likewise, the second device can be an endpoint network interface, server, switch, host device, electrical or optical module, or any device. The connection can be a copper cable, backplane, any type of Ethernet cable, optical cable, or any wired or wireless signal propagation media. A transceiver can include a transmitter and a receiver. Signals propagated through the connection can be use compatible with Ethernet, FibreChannel, Infiniband, Serial Attached Small Computer System Interface (SAS), or any communication standard. Note that first and second devices can perform independent transmitter or receiver equalizer setting adjustments.

At 502, a PMD control state flow control start indication is received at a first device. For example, the PMD control state flow can refer to use of IEEE 802.3-2018 Clause 136.8.10 PMD control function state machines. For a start-up protocol training enabled, training can be performed by device attempting to perform a link training and form a link. For example, the state can be an INITIALIZE state. Variable mr_training_enable can be a Boolean variable used by a system management to enable or disable the start-up protocol. When mr_training_enable is set to true it enables the start-up protocol.

At 504, link training can commence whereby training signals are sent by the first device to the second device and training signals are sent by the second device to the first device. For example, training signals can include training frames with prescribed data or bit patterns. The signal_detect variables can be set independently on each lane by the PMD control state diagram in order to enable a lane to perform detect training frames. At 506, the first device can adjust transmitter or receiver equalizer settings to account for channel impairments based on decoding training signals. For example, the first device can perform the SEND_TF state. A condition to move from SEND_TF state to TRAIN_LOCAL state can depend on statuses of local_tf_lock and remote_tf_lock being true where statuses of local_tf_lock and remote_tf_lock indicate that the training frame marker positions have been identified by the respective local receiver of the first device and the remote receiver of the second device. The local_tf_lock status can be sent by a first device over a training frame and indicated as remote_tf_lock to the second device. Conversely, the local_tf_lock status can be sent by second device over a training frame and indicated as remote_tf_lock to the first device.

At 508, the first device can adjust equalizer settings of its receiver equalizer settings. For example, the first device can operate in the TRAIN_LOCAL state and adjust its receiver equalizer settings. For example, a PMD of the first device may request its link partner to change the transmitter equalization coefficients, e.g., to predefined initial conditions or by individual coefficient control.

At 510, during equalizer training to handle link impairments, the first device can detect for conditions that lead to exiting training status. For example, the first device can detect for (a) whether training frame marker positions remain identified by the local receiver of the first device; (b) whether training frame marker positions remain identified by the receiver of the second device; or (c) a training timer has expired. For example, the first device can exit to TIMEOUT state if any of (a) local_tf_lock is not true, (b) remote_tf_lock is not true, or (c) a max_wait_timer_done is true. If a condition if met that leads to exiting training state, the process proceeds to 520. If a condition if not met that leads to exiting training state, the process proceeds to 512.

At 512, the first device can wait for the second device to complete training its receiver to handle channel impairments. For example, the first device can wait for the second device to complete its TRAIN_LOCAL state. For example, a PMD of the second device may request its link partner to change the transmitter equalization coefficients, e.g., to predefined initial conditions or by individual coefficient control.

At 514, during equalizer training to handle link impairments by the second device, the first device can detect for conditions that lead to exiting training status. For example, the first device can detect for (a) whether training frame marker positions remain identified by the local receiver of the first device; (b) whether training frame marker positions remain identified by the receiver of the second device; or (c) a training timer has expired. For example, the first device can exit to TIMEOUT state if any of (a) local_tf_lock is not true, (b) remote_tf_lock is not true, or (c) a max_wait_timer_done is true. If a condition if met that leads to exiting training state, the process proceeds to 520. If a condition if not met that leads to exiting training state, the process proceeds to 516.

At 516, the first device enters a data sending state with the second device. For example, the first device can enter the LINK_READY state and after a wait timer is completed, the first device can enter the SEND_DATA state to send data.

At 520, the first device can enter a time out state and training failure state. The time out state can be TIMEOUT state. After expiration of another timer, the first device can enter TRAINING_FAILED state and the link can be retrained with the second device.

Other ways of avoiding deadlock can be used such as a deadlock timer whereby if PMD control state flow does not complete with a certain amount of time, an administrator, system monitor, or error log can be updated to identify PMD control state flow has not completed within the deadlock timer. In some examples, during a next execution of PMD control state flow, initial equalizer settings can be set to start at a different starting value. For example, Next pages or an out-of-band interface can be used to communicate PMD control state flow has not completed within the deadlock timer or how to handle failure to achieve link training within the time set by the deadlock timer (e.g., restart training, use different initial equalizer settings, adjust equalizer settings up to a maximum level or minimum level).

Figure 6:
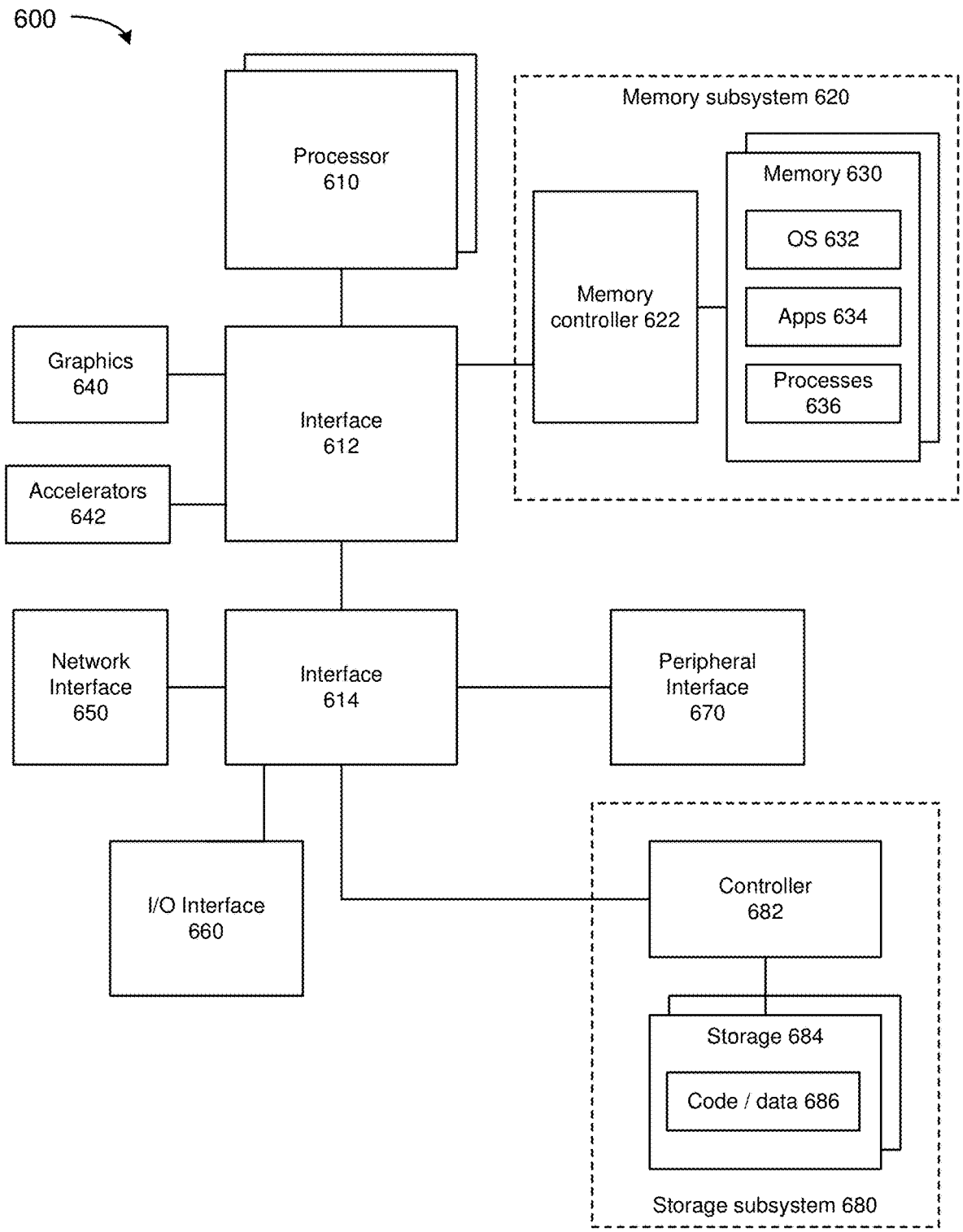
FIG. 6 depicts a system.

FIG. 6 depicts a system. The system can use embodiments described herein to perform link establishment, link training or link re-training in accordance with embodiments described herein. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a programmable or fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

FIG. 7 depicts an environment 700 includes multiple computing racks 702, each including a Top of Rack (ToR) switch 704, a pod manager 706, and a plurality of pooled system drawers. Various embodiments can be used to perform link establishment, link training or link re-training in accordance with embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 708, and Intel® ATOM™ pooled compute drawer 710, a pooled storage drawer 712, a pooled memory drawer 714, and a pooled I/O drawer 716. Each of the pooled system drawers is connected to ToR switch 704 via a high-speed link 718, such as a 40 Gigabit/second (Gb/s) or 100 Gb/s Ethernet link or a 100+Gb/s Silicon Photonics (SiPh) optical link. In one embodiment high-speed link 718 comprises an 800 Gb/s SiPh optical link.

Multiple of the computing racks 702 may be interconnected via their ToR switches 704 (e.g., to a pod-level switch or data center switch), as illustrated by connections to a network 720. In some embodiments, groups of computing racks 702 are managed as separate pods via pod manager(s) 706. In one embodiment, a single pod manager is used to manage all of the racks in the pod. Alternatively, distributed pod managers may be used for pod management operations.

Environment 700 further includes a management interface 722 that is used to manage various aspects of the environment. This includes managing rack configuration, with corresponding parameters stored as rack configuration data 724. Environment 700 can be used for computing racks.

Embodiments herein may be implemented in various types of computing and networking equipment, such as switches, routers, racks, and blade servers such as those employed in a data center and/or server farm environment.

The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 8:
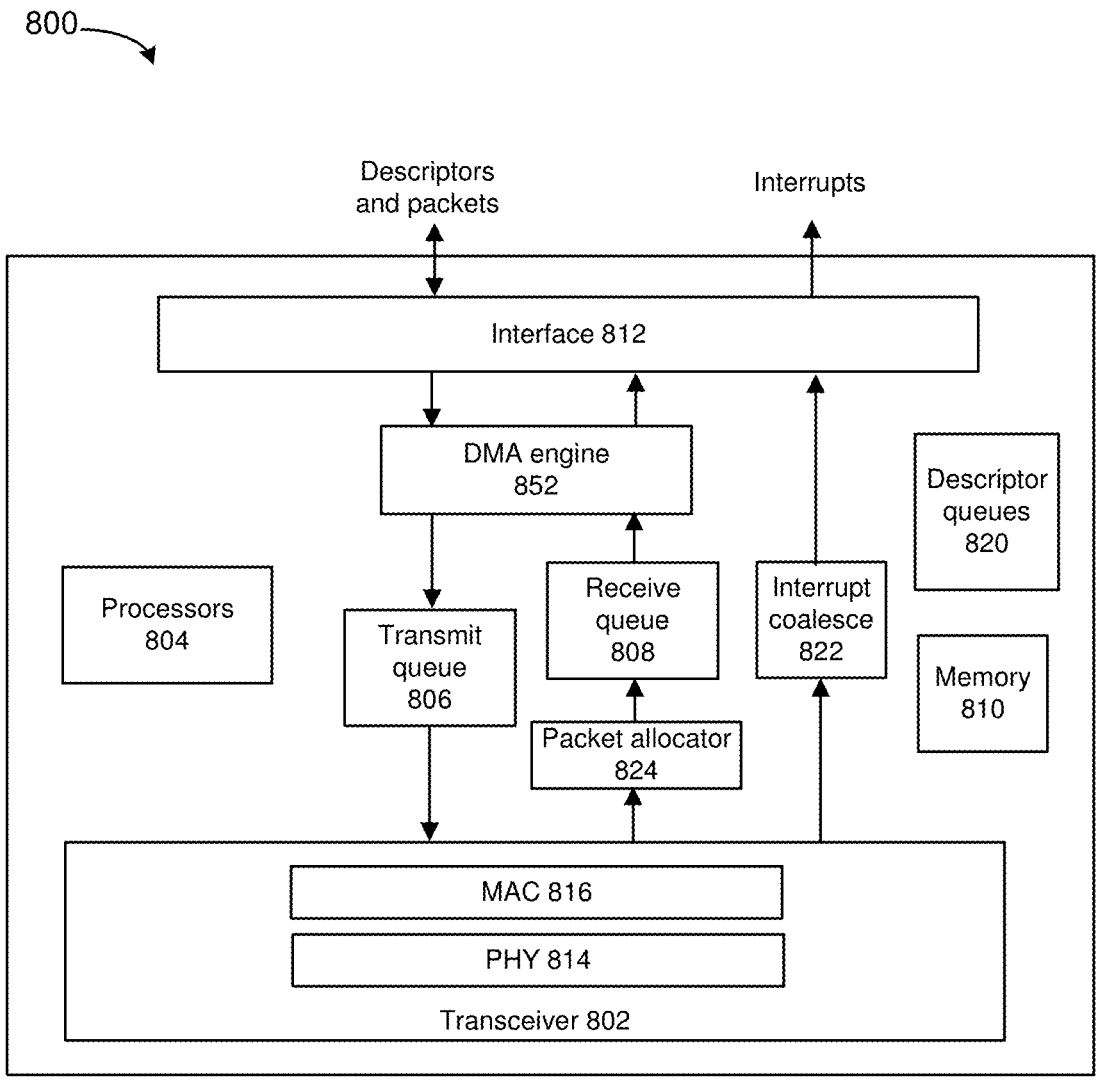
FIG. 8 depicts a network interface.

FIG. 8 depicts a network interface that can use embodiments or be used by embodiments. Various resources in the network interface can perform link establishment, link training or link re-training in accordance with embodiments described herein. Network interface 800 can include transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to assemble data to be transmitted into packets, that include destination and source addresses along with network control information and error detection hash values. Processors 804 can be any a combination of a: processor, core, graphics processing unit (GPU), field programmable gate array (FPGA), application specific integrated circuit (ASIC), or other programmable hardware device that allow programming of network interface 800. For example, processors 804 can provide for identification of a resource to use to perform a workload and generation of a bitstream for execution on the selected resource. For example, a "smart network interface" can provide packet processing capabilities in the network interface using processors 804.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with PCI, PCI Express, PCI-x, Serial ATA, and/or USB compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 9:
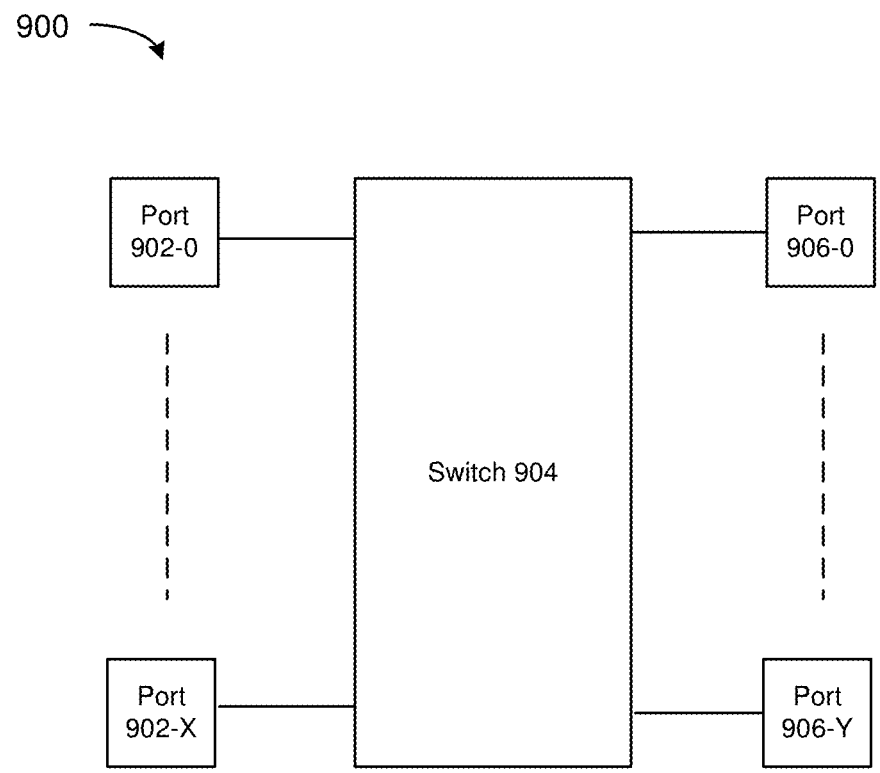
FIG. 9 depicts an example switch.
Figure 10:
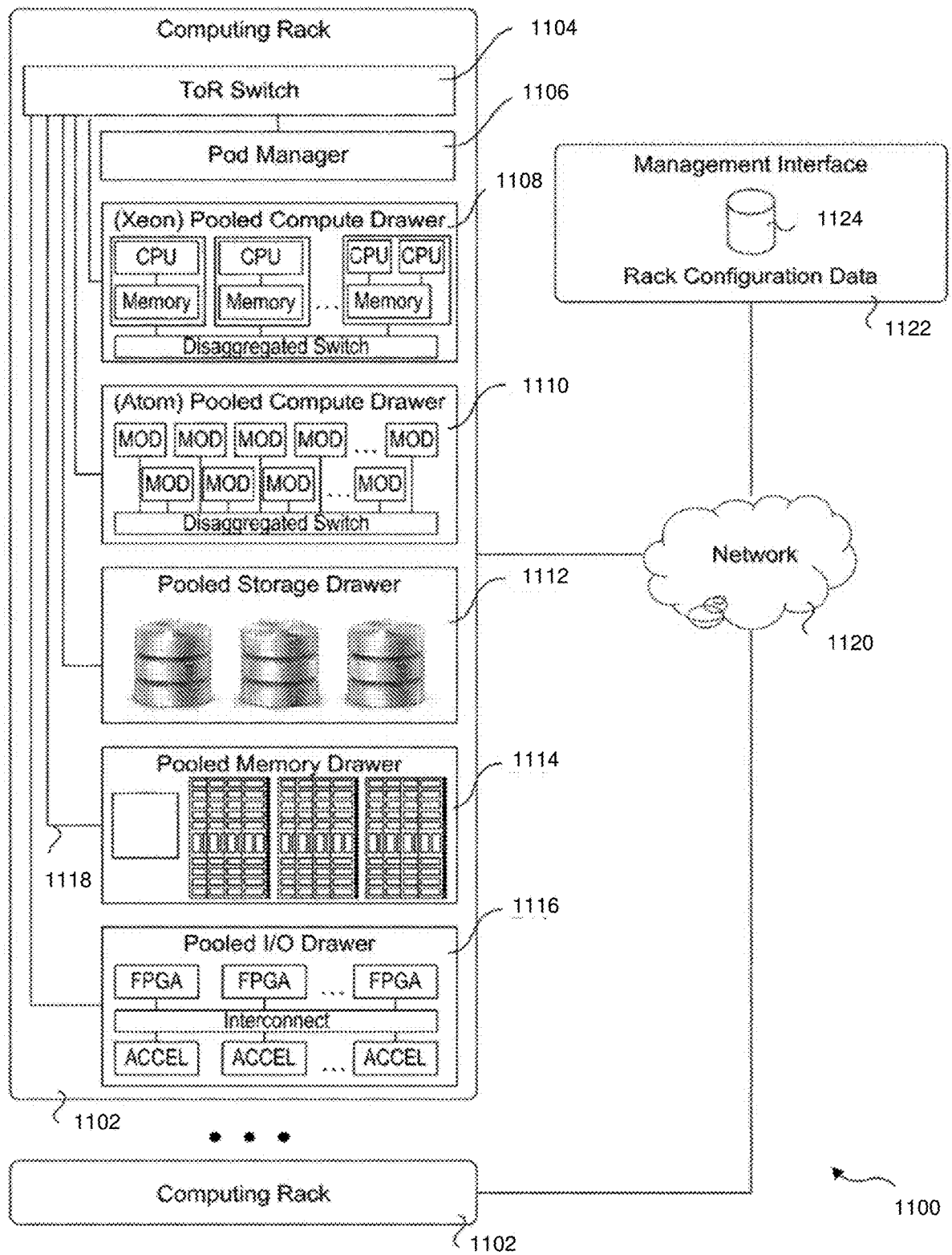
FIG. 10 depicts an example system.

FIG. 9 depicts an example switch. Various embodiments can be used in or with the switch to perform link establishment, link training or link re-training in accordance with embodiments described herein. Switch 904 can route packets or frames of any format or in accordance with any specification from any port 902-0 to 902-X to any of ports 906-0 to 906-Y (or vice versa). Any of ports 902-0 to 902-X can be connected to a network of one or more interconnected devices. Similarly, any of ports 906-0 to 906-X can be connected to a network of one or more interconnected devices. Switch 904 can decide which port to transfer packets or frames to using a table that maps packet characteristics with an associated output port. For example, match-action tables can be used whereby a hash of a portion of a packet is used as an index to find an entry. In addition, switch 904 can perform packet replication for forwarding of a packet or frame to multiple ports and queuing of packets or frames prior to transfer to an output port. Some embodiments implement hash-lookup in P4 programing language, which is a programming language designed to allow programming of packet forwarding in data-planes. In contrast to general purpose language such as C or python, P4 is domain-specific language with a number of constructs optimized around network data forwarding.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes a method comprising: at a first device, during link training of at least one lane consistent with IEEE 802.3 with a potential link partner, exiting to TIME_OUT state from TRAIN_LOCAL state based on consideration of expiration of a wait timer, loss of local_tf_lock state, and loss of remote_tf_lock state.

Example 2 includes any example and includes at the first device, during link training for at least one lane consistent with IEEE 802.3, exiting to TIME_OUT state from TRAIN_REMOTE state based on consideration of expiration of a wait timer, loss of local_tf_lock state, and loss of remote_tf_lock state.

Example 3 includes any example, wherein the link training consistent with IEEE 802.3 comprises performance of a PMD control function in Section 162.8.11 of IEEE 802.3ck.

Example 4 includes any example, wherein the local_tf_lock state comprises indication of successful decoding of training frames received at the first device from the potential link partner.

Example 5 includes any example, wherein the remote_tf_lock state comprises indication of successful decoding of training frames from the first device by the potential link partner.

Example 6 includes any example and includes restarting link training with a potential link partner after the TIME_OUT state.

Example 7 includes any example, wherein the first device comprises one or more of a switch, network interface, or server and the potential link partner comprises one or more of a switch, network interface, or server.

Example 8 includes any example, wherein a connection between the first device and the potential link partner comprises one or more of: a backplane or copper cable.

Example 9 includes any example, and includes: at the first device, applying auto-negotiation with the potential link partner before the link training.

Example 10 includes any example, and includes: receiving communication of loss of remote_tf_lock state via an out-of-band communication or from a system manager.

Example 11 includes any example, and includes an apparatus comprising: physical medium dependent (PMD) circuitry, the PMD circuitry to: during link training of at least one lane consistent with IEEE 802.3 with a second device, exit to TIME_OUT state from TRAIN_LOCAL state based on consideration of expiration of a wait timer, loss of local_tf_lock state, and loss of remote_tf_lock state.

Example 12 includes any example, and includes a physical layer interface (PHY) that comprises the PMD circuitry.

Example 13 includes any example, and includes a network interface that comprises the PMD circuitry.

Example 14 includes any example, wherein the PMD circuitry is to: during link training for at least one lane consistent with IEEE 802.3 with the second device, exit to TIME_OUT state from TRAIN_REMOTE state based on consideration of expiration of a wait timer, loss of local_tf_lock state, and loss of remote_tf_lock state.

Example 15 includes any example, wherein the link training consistent with IEEE 802.3 comprises performance of a PMD control function in Section 162.8.11 of IEEE 802.3ck.

Example 16 includes any example, wherein the local_tf_lock state comprises indication of successful decoding of training frames received at the PMD circuitry from the second device.

Example 17 includes any example, wherein the remote_tf_lock state comprises indication of successful decoding of training frames by the second device.

Example 18 includes any example, wherein the PMD circuitry is to: restart link training with the second device after the TIME_OUT state.

Example 19 includes any example, wherein the PMD circuitry is to: apply auto-negotiation with the second device before the link training.

Example 20 includes any example, wherein the PMD circuitry is to: receive communication of loss of remote_tf_lock state via an out-of-band communication or from a system manager.

Example 21 includes any example, and includes a server, data center, switch, or rack.

What is claimed is:

1. An apparatus comprising:
a network interface device comprising:
a media access control (MAC) circuitry;
a direct memory access (DMA) circuitry; and
a physical layer interface (PHY) comprising:
circuitry to:
during link training of at least one lane with a remote link partner:
change from a TRAIN_LOCAL state to a TIMEOUT state based at least on expiration of a wait time,
enter a state based at least on loss of local_tf_lock state or loss of remote_tf_lock state, and
exit from the TIMEOUT state to a TRAINING_FAILED state based at least on a holdoff_timer_done state.

2. The apparatus of claim 1, comprising:
circuitry to provide multiple transmit lanes;
analog equalizer circuitry associated with the multiple transmit lanes; and
a single microcontroller to control settings of the analog equalizer circuitry for the multiple transmit lanes based on the link training.

3. The apparatus of claim 1, comprising:
circuitry to provide multiple receive lanes;
analog equalizer circuitry associated with the multiple receive lanes; and
a single microcontroller to control settings of the analog equalizer circuitry for the multiple receive lanes based on the link training.

4. The apparatus of claim 1, wherein the local_tf_lock state comprises indication of successful decoding of training frames.

5. The apparatus of claim 1, wherein the remote_tf_lock state comprises indication of successful decoding of training frames by the remote link partner.

6. The apparatus of claim 1, wherein the circuitry is to:
receive communication of loss of remote_tf_lock state via an out-of-band communication.

7. The apparatus of claim 1, wherein the circuitry is to:
receive communication of loss of remote_tf_lock state by a read of a register of the remote link partner.

8. The apparatus of claim 1, wherein the link training is to commence based on connection of a cable.

9. The apparatus of claim 1, wherein lane rates comprise 50 Gbps or 100 Gbps.

10. The apparatus of claim 1, wherein at least one packet transmitted to the remote link partner is consistent with Ethernet.

11. An apparatus comprising:
a switch comprising:
circuitry to:
during link training of at least one lane with a remote link partner:

change from a TRAIN_LOCAL state to a TIMEOUT state based at least on expiration of a wait time,
enter a state based at least on loss of local_tf_lock state or loss of remote_tf_lock state, and
exit from the TIMEOUT state to a TRAINING_FAILED state based at least on a holdoff_timer_done state.

12. The apparatus of claim 11, comprising:
circuitry to provide multiple transmit lanes;
analog equalizer circuitry associated with the multiple transmit lanes; and
a single microcontroller to control settings of the analog equalizer circuitry for the multiple transmit lanes based on the link training.

13. The apparatus of claim 11, comprising:
circuitry to provide multiple receive lanes;
analog equalizer circuitry associated with the multiple receive lanes; and
a single microcontroller to control settings of the analog equalizer circuitry for the multiple receive lanes based on the link training.

14. The apparatus of claim 11, wherein the local_tf_lock state comprises indication of successful decoding of training frames.

15. The apparatus of claim 11, wherein the remote_tf_lock state comprises indication of successful decoding of training frames by the remote link partner.

16. The apparatus of claim 11, wherein the circuitry is to:
receive communication of loss of remote_tf_lock state via an out-of-band communication.

17. The apparatus of claim 11, wherein the circuitry is to:
receive communication of loss of remote_tf_lock state by a read of a register of the remote link partner.

18. The apparatus of claim 11, wherein the link training is to commence based on connection of a cable.

19. The apparatus of claim 11, wherein lane rates comprise 50 Gbps or 100 Gbps.

20. The apparatus of claim 11, wherein at least one packet transmitted to the remote link partner is consistent with Ethernet.

21. An apparatus comprising:
Ethernet physical layer transceiver (PHY) circuitry for use in frame communication with a remote link partner, the Ethernet PHY circuitry comprising:
circuitry to:
during link training of at least one lane with a remote link partner:
change from a TRAIN_LOCAL state to a TIMEOUT state based at least on expiration of a wait time,
enter a state based at least on loss of local_tf_lock state or loss of remote_tf_lock state, and
exit from the TIMEOUT state to a TRAINING_FAILED state based at least on a holdoff_timer_done state.

22. The apparatus of claim 21, comprising:
circuitry to provide multiple transmit lanes;
analog equalizer circuitry associated with the multiple transmit lanes; and
a single microcontroller to control settings of the analog equalizer circuitry for the multiple transmit lanes based on the link training.

23. The apparatus of claim 21, comprising:
circuitry to provide multiple receive lanes;
analog equalizer circuitry associated with the multiple receive lanes; and
a single microcontroller to control settings of the analog equalizer circuitry for the multiple receive lanes based on the link training.

24. The apparatus of claim 21, wherein the local_tf_lock state comprises indication of successful decoding of training frames.

25. The apparatus of claim 21, wherein the remote_tf_lock state comprises indication of successful decoding of training frames by the remote link partner.

26. The apparatus of claim 21, wherein the circuitry is to:
receive communication of loss of remote_tf_lock state via an out-of-band communication.

27. The apparatus of claim 21, wherein the circuitry is to:
receive communication of loss of remote_tf_lock state by a read of a register of the remote link partner.

28. The apparatus of claim 21, wherein the link training is to commence based on connection of a cable.

29. The apparatus of claim 21, wherein lane rates comprise 50 Gbps or 100 Gbps.

30. The apparatus of claim 21, wherein at least one packet transmitted to the remote link partner is consistent with Ethernet.

* * * * *